United States Patent

Nemiroff

[15] 3,641,411

[45] Feb. 8, 1972

[54] DYNAMIC AUTOMATIC BRAKING FOR TRUCK

[72] Inventor: Robert V. Nemiroff, Philadelphia, Pa.

[73] Assignee: Eaton Yale & Towne Inc., Cleveland, Ohio

[22] Filed: Sept. 20, 1967

[21] Appl. No.: 669,029

[52] U.S. Cl. .................................................. 318/373

[51] Int. Cl. ...................................................... H02p 3/06

[58] Field of Search ................. 318/373, 374, 379, 380, 258, 318/269

[56] References Cited

UNITED STATES PATENTS

| | | | |
|---|---|---|---|
| 3,297,930 | 1/1967 | Payne | 318/269 |
| 3,344,328 | 9/1967 | Morris | 318/258 |
| 3,213,343 | 10/1965 | Sheheen | 318/373 |
| 3,227,938 | 1/1966 | Draxler | 318/380 |

Primary Examiner—Bernard A. Gilheany
Assistant Examiner—W. E. Duncanson, Jr.
Attorney—Teagno & Toddy

[57] ABSTRACT

A dynamic braking system utilizing a switch that is operated by the accelerator of the truck, and that acts through a relay to move contacts that electrically reverse the traction motor of the truck when the accelerator moves to neutral position. The traction motor is driven by pulsating power that is applied also when the accelerator is in neutral position so as to brake the truck. Pulse limit means control the motor current while braking, and permit an increase in the pulse duty cycle when the truck substantially comes to rest and the braking effect ceases. The duty cycle, upon reaching a certain value, acts through the charging of a capacitor to operate transistors forming parts of a control circuit. That causes a silicon controlled rectifier to bypass the relay, causing the motor reversing contacts to return to a normal position. The accelerator while in neutral holds further contacts open so as to prevent a movement of the truck when the reversing contacts move to normal position.

12 Claims, 3 Drawing Figures

INVENTOR.
R.V. NEMIROFF
BY
ATTORNEYS

DYNAMIC AUTOMATIC BRAKING FOR TRUCK

In many of the electric trucks that are in use today, it is possible to effect dynamic braking simply through an electrical reversal of a traction motor of the truck, so that power applied to the motor will oppose the motion of the truck. Those persons skilled in the art will appreciate that the motor reversal, called plugging, can be successfully utilized for braking when properly controlled, and trucks already have been equipped with dynamic braking systems that are designed for the purpose.

I have conceived by my invention a novel dynamic braking system that requires but little control current while controlling the electrical reversal of a traction motor on a truck, and that acts automatically to allow the driver better control of the truck. My system will operate effectively on those trucks in which a pulsating electric current supplies the power for the motor.

In my invention, I utilize a manually operated switch that the driver of the truck will move to apply electric current to the connections of a traction motor so as to drive the motor in a predetermined direction, with circuit means that are effective when actuated to change the motor connections to cause dynamic braking. I then utilize a control circuit that is responsive to a predetermined level of voltage that is applied to the motor to make the circuit means ineffective, so that a further application of current to the motor will drive the motor in said predetermined direction.

My novel dynamic braking system includes a transistorized control circuit that will respond to an effective level of the voltage applied to the traction motor, and that will cause motor switch means to move away from a motor reversing position. As a feature of this part of my invention, I design my control circuit for use with a power circuit in which the power is applied in the form of pulses to the traction motor. The control circuit will act when the power pulses have a particular duty cycle, that being the duty cycle which develops when the motor reversal has brought the truck to a stop, or nearly so.

As a further feature, my system includes a manually operated switch through which the driver of the truck may control an application of dynamic braking power to a traction motor, together with a control circuit that will override the control that is applied through the switch. As a more particular part of this feature, I prefer to arrange the manually operated switch so as to move to braking position when an accelerator, by which the driver controls the truck speed, moves to a neutral position. The truck driver may leave the accelerator in neutral position, but the control circuit will act automatically to remove the motor from power when the truck slows to a predetermined speed, or stops.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Figure 1:
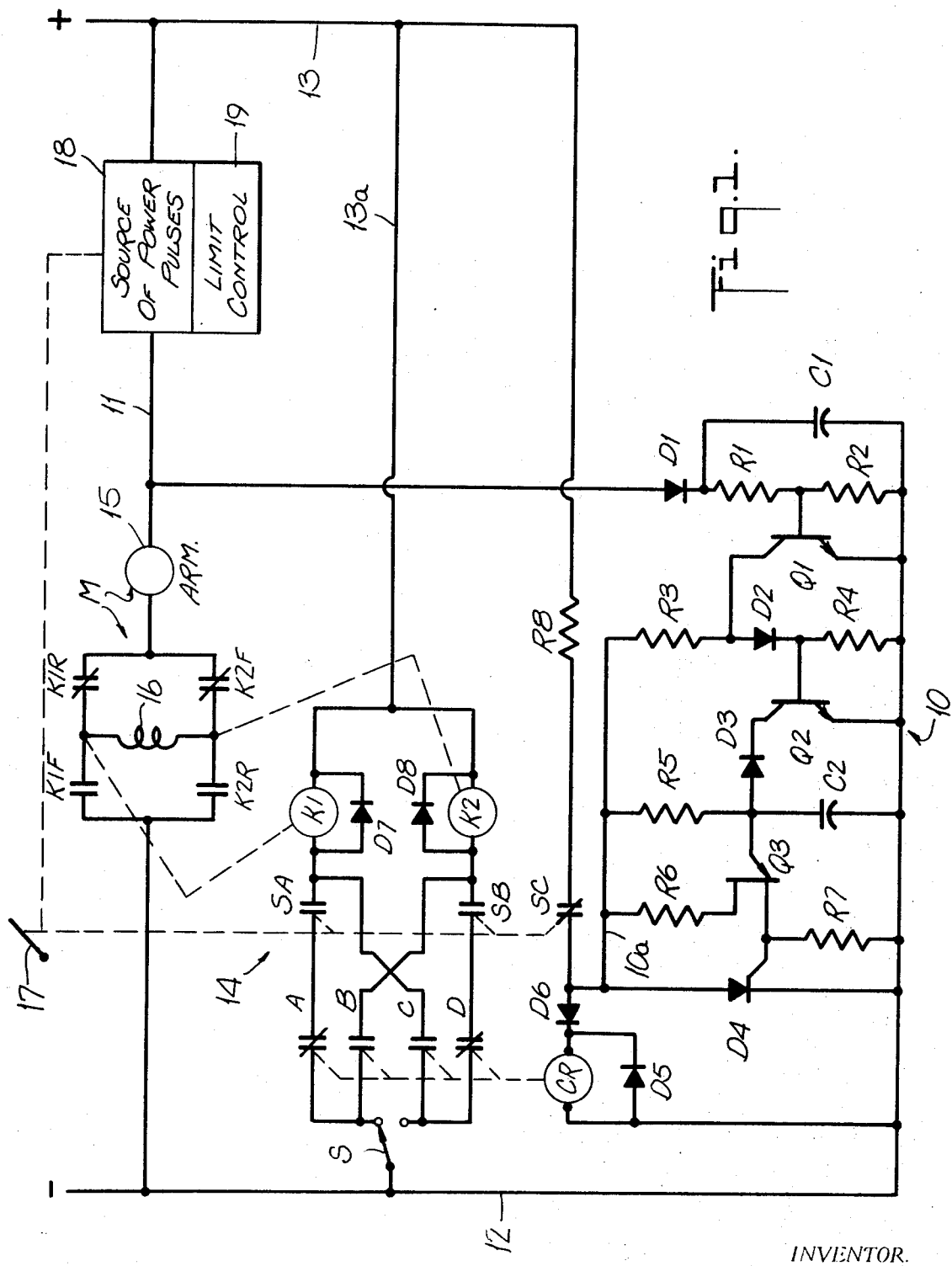
FIG. 1 shows a diagram of a truck power circuit utilizing my novel transistorized dynamic braking system.

Referring now more particularly to FIG. 1 of the drawings, I indicate generally by the numeral 10 a transistorized control circuit forming a part of my novel system. I show the control circuit 10 equipped with a capacitor C1 that is connected through a blocking diode D1 to a power line 11 for a traction motor M, so that capacitor C1 can be charged when pulses of positive electric current are directed toward the motor M. The capacitor C1 has a biasing network comprising resistors R1 and R2 and is connected to a transistor Q1. After each power pulse, capacitor C1 will begin to discharge so as to place transistor Q1 in conducting condition. When the duty cycle of the pulses has a relatively small value, the capacitor C1 will completely discharge between pulses so that transistor Q1 will not conduct. On the other hand, when the duty cycle of each pulse increases to a certain value, capacitor C1 will not fully discharge between pulses and will hold transistor Q1 in conducting condition.

There is a further transistor Q2 that may be held in conducting condition by positive current applied through a drive resistor R3. However, transistor Q1 when conducting will connect resistor R3 to negative power line 12, bypassing transistor Q2 so that it will not conduct. A diode D2 is connected in parallel relation to transistor Q1 so as to compensate a voltage drop across that transistor. Also, a resistor R4 acts as a base clamp for transistor Q2. There naturally will be suitable means, such as a battery on the truck (not shown), supplying the negative powerline 12 and a positive powerline 13.

A further capacitor C2 will be charged by positive current that may be applied through a resistor R5, and can discharge through a leakage blocking diode D3 and transistor Q2 to negative line 12 when transistor Q2 conducts. When transistor Q2 does not conduct, capacitor C2 will charge at a rate that is determined by the resistor R5, and upon reaching a predetermined level, the charge will cause a unijunction transistor Q3 to conduct. Capacitor C2 then will discharge through unijunction transistor Q3 and the gate of a silicon controlled rectifier D4, turning on that rectifier. A resistor R6 acts as a bias for unijunction transistor Q3, while a resistor R7 forms a gate clamp for rectifier D4.

It will now be seen that the control circuit 10 may act in response to a pulsating current that may be applied to traction motor M, and will complete a circuit through silicon-controlled rectifier D4 when the pulses have a predetermined duty cycle.

To explain the manner in which I utilize the control circuit 10, I shall first call attention to the fact that I connect a control relay CR in parallel relation to the rectifier D4 of the control circuit 10. A diode D5 is utilized to suppress an inductive transient from the control relay CR, and a diode D6 will compensate the voltage drop across rectifier D4, when conducting. Both the relay CR and silicon-controlled rectifier D4 will be connected to positive powerline 13 through switch contacts SC and a current limiting resistor R8. Contacts SC, when closed, also will supply positive current through line 10a to resistors R3, R5 and R6 of the control circuit 10.

When considering FIG. 1, I believe it will be clear that the control relay CR may be energized through closing of switch contacts SC, but that relay CR will be deenergized when bypassed by the silicon-controlled rectifier D4. Control relay CR naturally can be deenergized also by the opening of contacts SC. Those contacts by opening also will act to place rectifier D4 in "off" condition.

The control relay CR has four pairs of contacts A, B, C and D forming a part of circuit means that I indicate generally by the numeral 14. Contacts A and D may be termed driving contacts, and contacts B and C may be termed dynamic braking contacts. Each pair of driving contacts A and D normally is closed, directing negative current from line 12 toward a corresponding power contactor K1 and K2, depending upon the position of a manually operated reversing switch that I show at S. When control relay CR is energized, driving contacts A and D will open while the pairs of braking contacts B and C close. Braking contacts B and C then may direct current much as did driving contacts A and D, but are connected in a crossed relation for directing the current to an opposed contractor K2 or K1. In effect, control relay CR will reverse the manually operated reversing switch S while that switch S actually remains in the same position.

Those skilled in the art will recognize that the contactors K1 and K2 and traction motor M, as shown, are arranged in a manner that is usual on electric trucks, and therefore, I believe that the arrangement need not be described in detail. However, I may indicate that motor M has an armature 15 and a field 16 in series relation, and that the field 16 may be energized in opposed directions by the actuation of contactor K1 or K2 alternately. Thus, the actuation of contactor K1 will move contacts K1F and K1R so as to change the connection at one end of the motor field 16 from armature 15 to negative power line 12, and contactor K2 when actuated will similarly move contacts K2F and K2R at the opposed end of field 16. Associated with contacts K1 and K2 are diodes D7 and D8 for suppressing transients, and a line 13a connects the contractors to positive power line 13.

Figure 2:
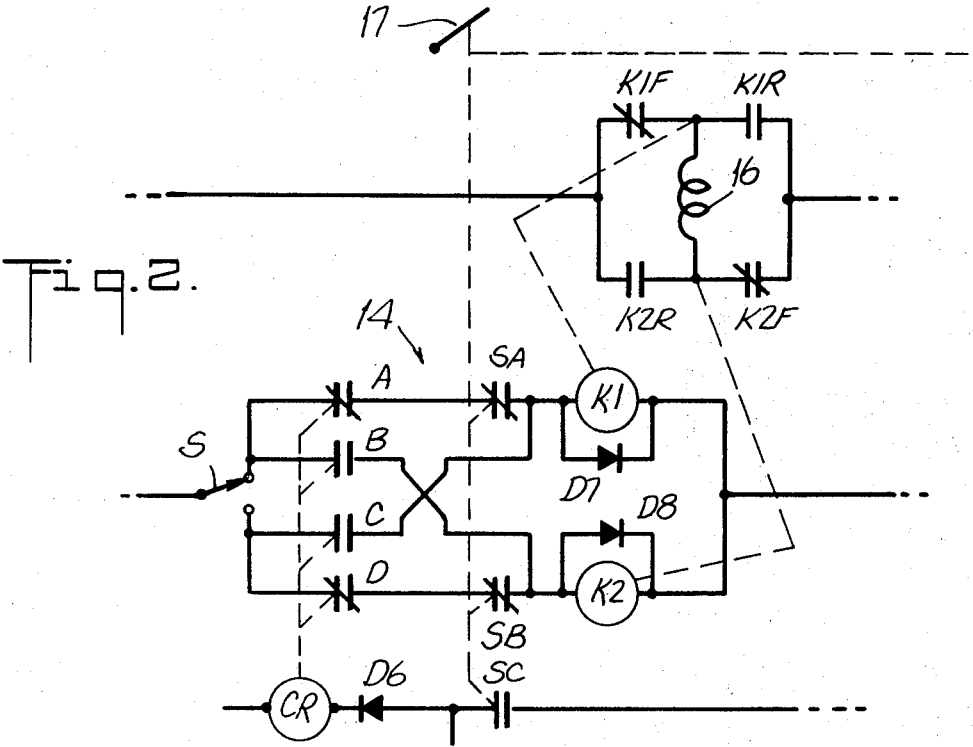
FIG. 2 is a partial view showing the contacts of the circuit in position for driving in a predetermined direction.

Again considering the circuit means 14, I show a pair of switch contacts SA arranged in series with driving contacts A of relay CR, and a further pair of contacts SB in series with driving contacts D. In the construction that I prefer, those switch contacts SA and SB will be operated by an accelerator pedal 17 through which the driver controls the speed of the truck. While accelerator pedal 17 is in neutral position, FIG. 1, contacts SA and SB will be open, and those contacts will close when the driver moves pedal 17 toward a driving position, FIG. 2. Preferably, also, accelerator pedal 17 will move the switch contacts SC that I already have described, but in an opposed manner causing contacts SC to open while contacts SA and SB close.

To understand the operation of contacts SA, SB and SC, it is necessary to know that some power will be directed through line 11 toward traction motor M when the accelerator pedal 17 is in neutral position. For purposes of disclosure, I show a source os power pulses that I indicate by the numeral 18, and that may very well be like the one which is shown in the earlier application of A. C. Dannettell, D. C. Tedd and myself, Ser. No. 625,148, filed Mar. 22, 1967, including a limit control 19 that will automatically limit the duty cycle of the pulses during plugging of the traction motor. The accelerator pedal 17 is connected to the pulse source 18, as indicated in dotted lines in FIG. 1, and normally can vary the duty cycle of the power pulses, controlling the average voltage that is applied to the motor and thereby controlling truck speed. In my novel braking system, the pulse source 18 is so adjusted that the power pulses directed toward the traction motor M will have a substantial duty cycle while the accelerator pedal 17 is in neutral position. I have found that my braking system will operate well when the particular duty cycle has approximately one-fifth of its full-power value. However, the limit control 19 naturally may reduce the duty cycle to a lesser value, as during plugging of the motor.

The construction and operation of the limit control 19 and the source of power pulses 18 is more fully described in the Dannettell, Nemiroff and Tedd U.S. Pat. No. 3,551,773 filed Mar. 22, 1967. Generally, the source of power pulses 18 and the limit control 19 operate in the following manner. The source of power pulses 18 controls the duty cycle of the pulses supplied to the motor when the motor is operating in a nonbraking mode of operation with the duty cycle increasing as the desired speed of the motor is increased. The limit control 19 operates during dynamic braking or plugging of the truck to reduce the duty cycle of the pulses. The limit control 19 controls the duty cycle of the pulses so that the duty cycle of the pulses is inversely dependent upon the degree of dynamic braking which is occurring. Initially during dynamic braking the limit control 19 limits the duty cycle of the pulses so that capacitor C1 is never fully charged and transistor Q1 stays in its nonconductive condition. As the degree of dynamic braking decreases, the limit control 19 will enable the duty cycle of the pulses to increase and capacitor C1 will charge up to provide for conduction of transistor Q1. When transistor Q1 is rendered conductive, by the increase in the duty cycle, as controlled by the limit control 19, transistor Q2 will turn off and capacitor C2 will charge and fire unijunction Q3 to render SCR D4 conductive and thereby deenergize coil CR. Coil CR will open the contacts to cease braking of the vehicle.

To review the operation of my novel braking system, let us first suppose that the traction motor M is operating to drive the truck. The driver has placed the direction switch S in a directional position, as in FIG. 2, and holds the accelerator 17 depressed so that switch contacts SA are closed. Also, switch contacts SC are open so that control relay CR is deenergized and its driving contacts A are closed. Therefore, contactor K1 is actuated, placing the motor connections in a position enabling the power pulses from the source 18 to drive the motor in a particular direction.

Figure 3:
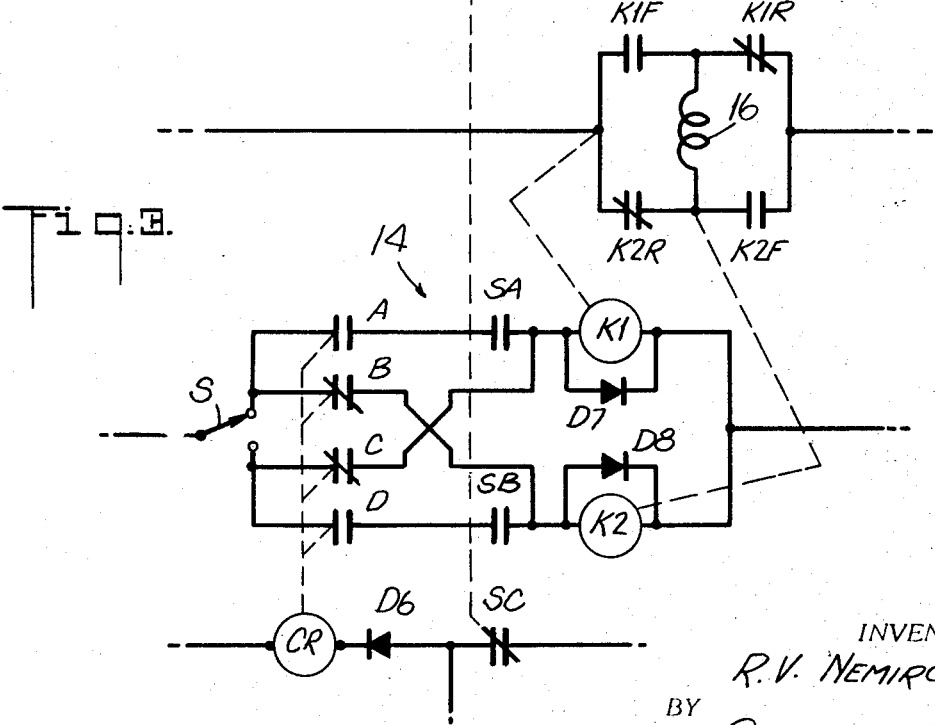
FIG. 3 is like FIG. 2 but shows the contacts in dynamic braking position.

Now, should the driver of the truck move or allow the accelerator 17 to move to neutral position, that movement will open contacts SA, as in FIG. 3, so that contactor K1 will disconnect the power circuit of the motor M, but contacts SC will close so that relay CR places its braking contacts B in closed position. The contactor K2 thus is energized, changing the motor connections so that traction motor M is reversed and the power coming from the source 18 will effect dynamic braking.

The braking effect naturally will diminish as the truck substantially comes to rest, causing a change in the wave form of the power pulses, as may be due to the limit control 19 permitting the duty cycle to increase. When the duty cycle increases to a predetermined value, capacitor C1 will remain charged, thus acting through control circuit 10 to turn on the silicon-controlled diode D4. That will shunt the control relay CR, opening the braking contact B, as in FIG. 1, so that braking ceases. Relay CR also has closed the driving contacts A, but it will be remembered that the accelerator 17 now is in neutral position, so that contactors K1 and K2 both are deenergized. Therefore, the motor connections have been changed so as to disconnect the traction motor M from power, and the motor can cause no further movement of the truck until the driver again operates accelerator 17.

While I have not referred in detail to the operation of relay contacts C and D, it will be understood that those contacts will operate in the way that I have described in connection with contacts A and B, but with the truck moving in an opposed direction. In other words, my system will act in the same manner whether the driver has placed the direction switch S in one directional position or another.

I do wish to point out that a person who is skilled in the art conceivably may design switch means that will act as does the control relay CR and its contacts A, B, C and D. Therefore, I do not wish to be limited by the relay and contacts that I have particularly shown.

Also, it is quite possible that some users of electric trucks will prefer that dynamic braking be effected independently of the position of the accelerator. While I do prefer to utilize accelerator control, an independent braking control may easily be arranged merely by designing the switch contacts SC so as to be operated through a separate manual control. Coasting of the truck then may be effected merely by utilizing accelerator 17 to place contacts SA and SB in open position, as in FIG. 1, while the manual control places contacts SC in open position, as in FIG. 2. I also may effect coasting when utilizing full accelerator control, as I have described, merely by designing the contacts SC so as to close somewhat after the contacts SA and SB open, permitting the accelerator an intermediate position applying neither driving power nor braking power while the truck yet is in motion.

I believe it will now be understood that I contribute by my invention a novel dynamic braking system that will operate very effectively and that will allow a truck driver better control of the truck movement. Moreover, my system will require relatively little power for its operation. I believe, therefore, that those skilled in the art will appreciate the merits of my invention.

I now claim:

1. In a dynamic braking system for a truck having an electric traction motor and a source of current for the motor, manually operated first switch means movable from a neutral position to a position applying the current from said source to the motor connections to drive said motor in a predetermined direction, circuit means effective when actuated to change the motor connections whereby to effect dynamic braking of the motor, means responsive to the dynamic braking of the motor for causing the effective voltage of the applied current to change, second switch means for actuating said circuit means, and a control circuit responsive to a predetermined level of said changing voltage to make said circuit means ineffective to effect dynamic braking of the motor, whereupon a further application of current by said manually operated first switch means can again drive the motor in said predetermined direction.

2. A braking system as set forth in claim 1, in which said circuit means includes switching elements normally directing current toward the manually operated first switch means, and further switching elements bypassing said first switch means when said first switch means are in said neutral position.

3. A braking system as set forth in claim 2, in which said switching elements form parts of a relay controlled by said second switch means that actuates the circuit means, and said control circuit having a portion for overriding control of the relay by the second switch means.

4. A braking system as set forth in claim 1, in which said control circuit includes a portion connected to the motor so as to sense the effective voltage of the applied current, a further portion of said control circuit connected to the second switch means for controlling the second switch means independently of said first switch means, and transistors controlled by said first-mentioned portion of the control circuit for actuating said further portion of the circuit.

5. In a dynamic braking system for an electric truck that has means for applying power pulses to a traction motor of the truck to drive the truck, manually operated means for changing the connections of the traction motor from a driving position to a motor reversing position whereby to effect dynamic braking, limit means effective to reduce the duty cycle of the power pulses applied to the motor while the motor is so reversed, and a control circuit responsive to a predetermined duty cycle of the power pulses to override said manually operated means so as to effect a movement of the motor connections away from motor reversing position when the braking substantially ceases.

6. A braking system as set forth in claim 5, including a switch forming a part of said manually operated means, switching elements normally controlled by said switch, and means through which said control circuit is connected for controlling said switching elements independently of said switch.

7. A braking system as set forth in claim 5, in which the means for applying power pulses to the motor include an accelerator effective when moving fro a neutral position to increase the duty cycle of the pulses for driving the truck, and a switch forming a part of said manually operated means and actuated by the accelerator for applying the power pulses to the motor when the accelerator moves from the neutral position.

8. A braking system as set forth in claim 7, including switching elements through which said switch acts to apply the power pulses, and a portion of said control circuit for controlling said switching elements independently of said switch.

9. A braking system as set forth in claim 6, in which said control circuit includes a sensing portion connected to the motor so as to sense the effective voltage of the power pulses applied to the motor, and transistors through which said sensing portion will act for controlling the switching elements.

10. A braking system as set forth in claim 9, in which said sensing portion of the control circuit comprises a capacitor charged by the power pulses, and a silicon-controlled diode forming a part of the control circuit and actuated through the transistors for controlling said switching elements when the charging of the capacitor indicates an increase in the pulse duty cycle, when said limit means permit an increase in the duty cycle due to a decrease of the braking action.

11. In a dynamic braking system for a truck that is equipped with an electric traction motor and a source of electric current for said motor, an accelerator, means controlled by the accelerator and effective for applying the current from said source to the traction motor when the accelerator is in a driving position and also when in a neutral position, including means changing the motor connections from driving position to a motor reversing position when the accelerator moves to neutral, means responsive to the changing of the motor connections to a motor reversing position to cause a change in the effective voltage of the applied current, and a control circuit connected to the traction motor and controlled by the effective voltage of said current to override the accelerator control whereby to disconnect the motor from the source of power when the motor reversal brings the motor substantially to rest.

12. A braking system as set forth in claim 11, in which said control circuit includes a portion connected to the motor so as to sense the voltage of the applied current, a further portion of said control circuit connected to said means that are controlled by the accelerator and effective when actuated to override the accelerator control of those means, and transistors controlled by the first-mentioned portion of the control circuit for actuating said further portion of the circuit.

* * * * *